(12) United States Patent
Choi

(10) Patent No.: US 8,996,585 B2
(45) Date of Patent: Mar. 31, 2015

(54) DATABASE MANAGEMENT METHOD FOR PROVIDING NEW KEYWORD, COMPUTER-READABLE MEDIA AND COMPUTING APPARATUS FOR THE SAME METHOD

(71) Applicant: Hyun Wook Choi, Daejeon (KR)

(72) Inventor: Hyun Wook Choi, Daejeon (KR)

( * ) Notice: Subject to any disclaimer, the term of this patent is extended or adjusted under 35 U.S.C. 154(b) by 251 days.

(21) Appl. No.: 13/751,200

(22) Filed: Jan. 28, 2013

(65) Prior Publication Data
US 2013/0198241 A1    Aug. 1, 2013

(30) Foreign Application Priority Data
Jan. 31, 2012 (KR) ................ 10-2012-0010098

(51) Int. Cl.
*G06F 17/30* (2006.01)

(52) U.S. Cl.
CPC .... *G06F 17/30634* (2013.01); *G06F 17/30958* (2013.01); *G06F 17/30731* (2013.01)
USPC ........................................................ 707/800

(58) Field of Classification Search
CPC ................ G06F 17/30634; G06F 17/30002; G06F 2207/025; G06F 17/30958; G06F 17/30731
See application file for complete search history.

(56) References Cited

U.S. PATENT DOCUMENTS

| | | | | |
|---|---|---|---|---|
| 5,048,014 | A * | 9/1991 | Fischer | 370/258 |
| 6,331,905 | B1 * | 12/2001 | Ellinas et al. | 398/2 |
| 6,407,983 | B1 * | 6/2002 | Zheng et al. | 370/232 |
| 7,603,408 | B1 * | 10/2009 | McGinnis et al. | 709/203 |
| 8,224,994 | B1 * | 7/2012 | Schneider | 709/245 |
| 2005/0073958 | A1 * | 4/2005 | Atlas et al. | 370/238 |
| 2006/0200432 | A1 * | 9/2006 | Flinn et al. | 706/12 |
| 2008/0049621 | A1 * | 2/2008 | McGuire et al. | 370/236.2 |
| 2012/0254619 | A1 * | 10/2012 | Dhuse et al. | 713/176 |
| 2013/0059536 | A1 * | 3/2013 | Froech et al. | 455/41.1 |

* cited by examiner

*Primary Examiner* — Leslie Wong

(57) ABSTRACT

A network management method is provided, which includes creating one or more networks defined by a closed loop based on unidirectional links among basic memory units, and creating a new network based on a new closed loop which is constructed based on two or more networks. Accordingly, it is possible to read information regarding another associated networks, upon reading about information regarding one of the created networks.

6 Claims, 7 Drawing Sheets

50: computer
51: processing device
52: storage device
53: input/output device
100: memory unit 50: computer
51: processing device
52: storage device
53: input/output device
100: memory unit

FIG. 1B database 120

R1
R2
R3
basic memory unit identifier 110

130
number of activation

| Net ID | Linked Unit ID |
|---|---|
| N111 | U23 |
| N112 | U21 |
| N113 | U56 |
| ... | ... |

| Unit ID | U22 |
|---|---|
| # of Activation | 6000 |

F1  F2  100 memory unit

FIG. 1C

100 memory unit

U22

(N111, U23)

(N112, U21)

(N113, U56)

N1:ORIENTAL MELON
N2:BANANA
N3:YELLOW FRUIT
N4:FRUIT

DATABASE MANAGEMENT METHOD FOR PROVIDING NEW KEYWORD, COMPUTER-READABLE MEDIA AND COMPUTING APPARATUS FOR THE SAME METHOD

CROSS-REFERENCE TO RELATED APPLICATION

This application claims priority to and the benefit of Korean Patent Application No. 10-2012-0010098 filed on Jan. 31, 2012, in the KIPO (Korean Intellectual Property Office), the disclosure of which is incorporated herein by reference in its entirety.

BACKGROUND OF THE INVENTION

1. Field of the Invention

The present invention relates to managing database, and more particularly, to creating and managing a network by using database. The present invention may be used for generating a network of search keyword and associated words and manages the same, to provide an associated word in response to a search keyword as inputted.

2. Description of the Related Art

Internet users generally input search keywords in the information search system such as a web search program to locate intended information. For the users' convenience, the search system may provide the users with a list of associated words including the words that are associated in their meaning to the inputted keyword. By way of example, a user may have different outcomes between when he inputs keyword 'train' in the web search program and when he inputs keyword 'high-speed train', but the outcomes may include a keyword that can bring about more desirable result. However, people sometimes do not recall a suitable keyword to input into the web search program. For example, a user who wants to find about 'high-speed train' may not recall the exact word, but only recalls the word 'train'. When the user inputs the word 'train', the web search program may provide not only the information acquired by the word 'train', but also a list of associated words possibly including the word 'high-speed train'. Accordingly, the user may try another search with the word 'high-speed train'.

The list of related words may include words associated in their meaning to the inputted keyword, such as hypernyms, hyponyms, synonyms, related words, substituting words, etc. Further, by utilizing the etymology of the words, the words with statistical relevancy such as independent or dependent developments of the words may be included in the list. The list of associated words may additionally include words that are linked from various viewpoints. For example, to a user who inputs a keyword 'KIM Yu-Na', the Korean female figure skater, a list of associated words may be provided, including: 'Suri High School' that Kim Yu-Na went to; 'Vancouver Winter Olympic Games/Pyeongchang Winter Olympic Games'; 'Kiss and Cry'—the television entertainment program that featured Kim Yu-Na; 'Asada Mao'—the rival Japanese female figure skater; 'Air conditioner TV commercial' that features Kim Yu-Na; or other various associated words. The user provided with the list of associated words is able to input various additional words associated with the keyword he initially inputted and therefore, provided with a broader or more exact search range.

However, it takes professionals a considerable cost and time to work on the creation of the list of associated words. Accordingly, to automate the process of creating the list of associated words, various automation methods have been proposed, including simultaneous occurrence cartography which defines association among the words based on the possibility of simultaneous occurrence, and cartography which defines words frequently appearing in each categorized document networks as the associated words. One of the methods to create a list of associated words automatically is to create a list of words including part of the keywords inputted by the user that are actually executed, and in response to an input of a new keyword to the associated word search device, to identify associated words of the new keyword and provide the same to the user. However, because these methods generally consider statistical relationship, (without considering relationship among the words in terms of meaning), problem arises that the relationship among the automatically-created associated words is sometimes not quite convincible.

To provide a list of associated words, an information search system may evaluate association between an inputted keyword and another word, select a word with high association and include the selected word in the list of associated words. The quality of the list of associated words may be evaluated based on whether the association among the inputted keyword and the words of the list of the associated words is convincible enough. Accordingly, an evaluation method is necessary, which can effectively evaluate association between an inputted keyword and another word.

SUMMARY OF THE INVENTION

Aspects of the present inventive concept overcome the above disadvantages and other disadvantages not described above. Also, the present inventive concept is not required to overcome the disadvantages described above, and an exemplary embodiment of the present inventive concept may not overcome any of the problems described above.

Accordingly, a technical objective is to provide a database management method for use in an information search system. The database management method includes a method for defining a network by using a database, a method for creating a new network, a method for setting relationship among networks, and a method for reading out information about another network related to a network.

When implemented on the information search system, the respective defined networks may respond to search keywords on a one-to-one basis. Accordingly, reading out information about another network related to one network may correspond to reading out another word associated with a search keyword.

A technical objective is to provide a database management technology to define and create a new network, and manage the network, which is applicable to not only the information search system, but also other areas.

The network management technology in one embodiment is motivated by a behavior of neutrons. At least part of the neurons is capable of transmitting stimulus in one direction. Although neurons transmit stimulus in one direction, the neurons may form a closed loop, in which the stimulus transmitted by a first neuron can be transmitted via the last neuron to be returned back to the first neuron. This closed loop can be defined as one network. The closed loop may be enlarged or reduced over time, instead of being fixed. As a result, the network defined by the closed loop may be enlarged or reduced. While two different closed loops are enlarged or reduced, one neuron can belong to two closed loops. The existence of the neuron belonging to two networks can cause creation of a new closed loop. Depending on viewpoints, the network management technology according to the present invention may correspond to artificial intelligence.

In one aspect of the present invention, based on the above-explained modeling, a network management method imitating the behavior of neuron is provided. According to the management method, one 'basic memory unit' may correspond to one 'neuron'. One network may be defined by using several basic memory units.

One possible model may implement relationship among the neurons of one network depending on spatial arrangement and biochemical substance transmission, but a different model may be implemented when applied in the computing field. That is, to correspond the 'basic memory unit' to one neuron, the 'basic memory unit' may be required to have a database. Depending on various viewpoints, a network management technology utilizing basic memory unit having a database will be explained.

A 'computer-readable medium' as used herein refers to a media readable by a computer, recording therein one or more programs including commands to change one or more content of a plurality of basic memory units of an electronic device. The plurality of basic memory units may each include a database including a basic memory unit identifier, and one or more records including a network identifier field to identify a network and a basic memory unit link field. According to the commands, information indicating a first network is recorded in a network identifier field of each of the first records included respectively in (N) basic memory units from among the plurality of basic memory units, and information representing basic memory unit identifier of the [mod(I, N)+1]th basic memory unit ($1 \leq I \leq N$) is recorded in the basic memory unit link field of the first record of the [i]th basic memory unit from among the (N) number of basic memory units. As used herein, the operator mod(x, y) indicates a remainder of dividing x by y.

When executed on an electronic device, the above-mentioned commands may dictate that information about second network be recorded in the network identifier field of the second record each included in (M) number of basic memory units from among the plurality of basic memory units, and information representing basic memory unit identifier of the [mod(j, M)+1]th basic memory unit ($1 \leq j \leq M$) be recorded in the basic memory unit link field of the second record of the [j]th basic memory unit from among the (M) number of basic memory units.

When executed on an electronic device, the above-mentioned commands may also dictate that a third closed loop be constructed based on a first closed loop, formed based on the information included in the basic memory unit link field of the first records each included in the (N) number of basic memory units, and a second closed loop, formed by the information included in the basic memory unit link field of the second records each included in the (M) number of basic memory units.

Further, when executed on an electronic device, the above-mentioned commands may also dictate that the third closed loop be formed by writing information representing a third network in a network identifier field of third record each included in (L) number of basic memory units, which are union of the (N) and (M) number of basic memory units, and writing information representing basic memory unit identifier of [mod(k, L)+1]th ($1 \leq k \leq L$) basic memory unit in the basic memory unit link field of the third record included in a [k]th basic memory unit of the (L) number of basic memory units.

A 'computer-readable medium' as used herein refers to a media readable by a computer, recording therein one or more programs including commands to change one or more content of a plurality of basic memory units of an electronic device. When executed on an electronic device, the above-mentioned commands may dictate that information about a first network be recorded in (N) number of basic memories among a plurality of basic memory units. Further, recording information regarding the first network may include recording information to define first unidirectional links among the (N) number of basic memory units to the (N) number of basic memory units so that one first closed loop is defined by the (N) number of basic memory units.

When executed on an electronic device, the above-mentioned commands may dictate that information about a second network be recorded in (M) number of basic memories among a plurality of basic memory units. Further, recording information regarding the second network may include recording information to define second unidirectional link among the (M) number of basic memory units to the (M) number of basic memory units so that one second closed loop is defined by the (M) number of basic memory units.

Further, when executed on the electronic device, the commands may direct so that information regarding a third network is written in (L) number of basic memory units which are union of the (N) and (M) number of basic memory units, and writing the information regarding the third network includes writing information to define third unidirectional links among the (L) number of basic memory units to the (L) number of basic memory units, and the third closed loop may be defined based on the first and second closed loops.

Further, the first closed loop may be formed as a [i]th basic memory unit of the (N) number of basic memory units points toward a [mod(j, M)+1]th basic memory unit ($1 \leq i \leq N$, i, N=integer), the second closed loop may be formed as a [j]th basic memory unit of the (M) number of basic memory units points toward a [mod(i, N)+1]th basic memory unit ($1 \leq j \leq M$=integer), and the third closed loop may be formed as a [k]th basic memory unit of the (L) number of basic memory units points toward a [mod(k, L)+1]th basic memory unit ($1 \leq k \leq L$, k, N=integer).

In one embodiment, a method for managing one or more networks maintained in an electronic device using a plurality of basic memory units, wherein the electronic device comprises a memory having the plurality of basic memory units, and one or more processors is provided. The method may include defining a first closed loop with (N) number of basic memory units of the plurality of basic memory units, by writing information defining first unidirectional links among the (N) number of basic memory units in the (N) number of basic memory units, defining a second closed loop with (M) number of basic memory units of the plurality of basic memory units, by writing information defining second unidirectional links among the (M) number of basic memory units in the (M) number of basic memory units, and defining a third closed loop based on the first and second closed loops. A first, second and third networks may be defined by the first, second and third closed loops.

The first and second closed loops may share one or more basic memory units in common.

Further, the first closed loop may be formed by a consolidation of the first unidirectional links pointed at a [i]th basic memory unit of the (N) number of basic memory units toward a [mod(i, N)+1]th basic memory unit ($1 \leq i \leq N$, i, N=integer), the second closed loop may be formed by a consolidation of the second unidirectional links pointed at a [j]th basic memory unit of the (M) number of basic memory units toward a [mod(j, M)+1]th basic memory unit ($1 \leq j \leq M$, j, M=integer), and the third closed loop may be formed by a consolidation of the third unidirectional links pointed at a [k]th basic memory unit of the (L) number of basic memory units toward a [mod(k, L)+1]th basic memory unit (1≤k≤L, k, L=integer).

In one embodiment, a network management method for managing a plurality of networks maintained in an electronic device including one or more processors and memories, using a plurality of basic memory units each including a basic memory unit identifier, a network identifier field to identify a network, and a basic memory unit link field corresponding to the network identifier field, is provided. Information representing a first network is written in the network identifier field of a first record each included in (N) number of basic memory units among the plurality of basic memory units, and information representing the basic memory unit identifier of a [mod(i, N)+1]th basic memory unit may be written in the basic memory unit link field of the first record included in a [i]th basic memory unit of the (N) number of basic memory units (1≤i≤N, i, N=integer). The network management method may include writing information representing a second network in the network identifier field of a second record each included in (M) number of basic memory units among the plurality of basic memory units, and writing information representing the basic memory unit identifier of a [mod(j, M)+1]th basic memory unit may be written in the basic memory unit link field of the second record included in a [j]th basic memory unit of the (M) number of basic memory units (1≤j≤M, j, M=integer).

The network management method may additionally include reading out the network information written in the network identifier fields of the (N) or (M) number of basic memory units and outputting the same.

One or more of the (N) number of basic memory units may belong to the (M) number of basic memory units.

Further, the network management method may additionally include, among the plurality of basic memory units, adding a basic memory unit which does not belong to the first network to the first network, or adding a basic memory unit which does not belong to the second network to the second network.

Further, the network management method may additionally include removing one or more basic memory units belonging to the first network from the first network, or removing one or more basic memory units belonging to the second network from the second network.

Further, the network management method may additionally include, reading out the network information written in the network identifier fields of the basic memory units belonging to the first or second network and outputting the same.

In one embodiment, a computing device is provided, which may include the computer-readable medium explained above, a processing device which executes the program recorded on the computer-readable medium, and an output unit which outputs a result of processing by the processing device.

According to various embodiments, a database management technology is provided, which provides technologies to define, create and manage networks and which may be applied in not only the information search system, but also the other areas. For example, the network in one embodiment may correspond to a search keyword inputted to the information search system. However, the scope of the invention is not limited by the effects mentioned above.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which:

FIGS. 1A to 1D are provided to explain a basic memory unit applicable according to an embodiment of the present invention;

FIG. 6 illustrates a network management method according to an embodiment of the present invention.

In the following description, the same or similar elements are labeled with the same or similar reference numbers.

DETAILED DESCRIPTION

Figure 1A:
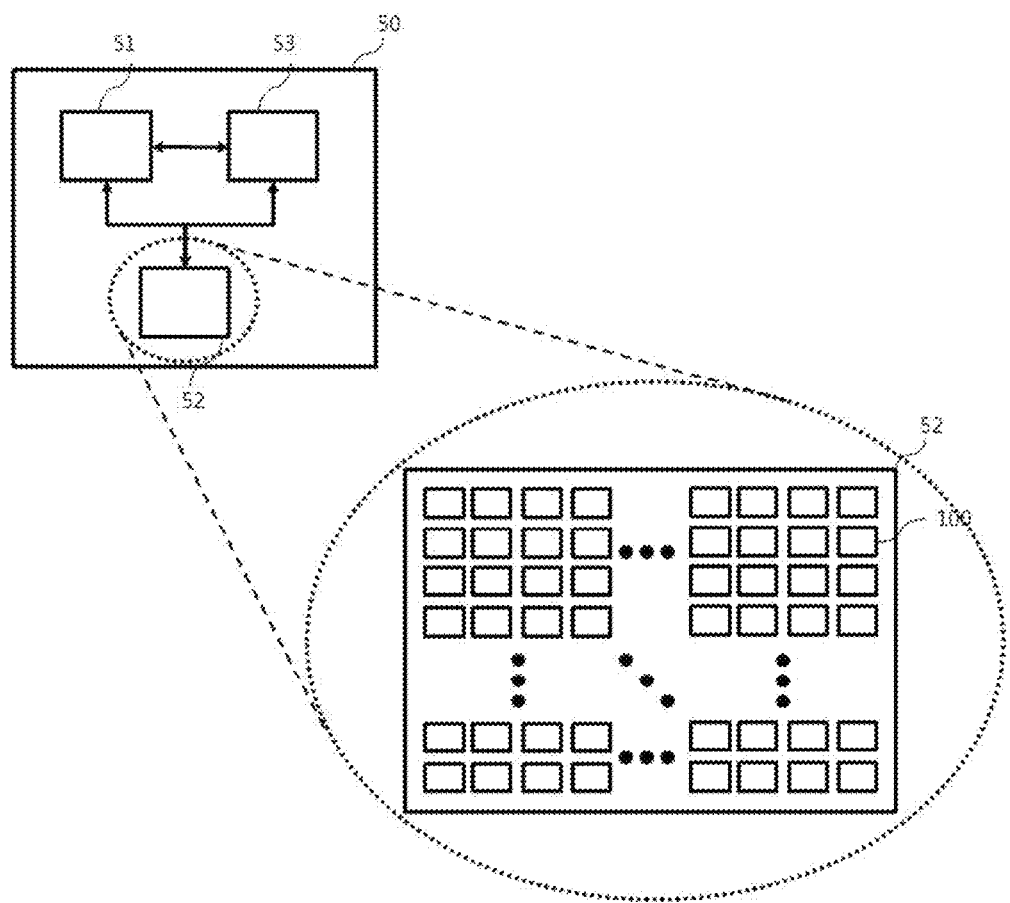

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, the entire wordings used herein, including technical or scientific terms, carry the same meanings as generally understood by those with knowledge in the field of the invention. The terms as generally defined in the dictionaries are interpreted based on the meaning in agreement with the context of the related technology, and unless otherwise specified, may not be interpreted to ideal or excessively formal meaning.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIGS. 1A to 1D are provided to explain a basic memory unit used in one embodiment of the present invention.

Referring to FIG. 1A, an embodiment may be implemented on a computer 50 which may include a processing device 51, a storage device 52, and an input/output device 53. In one embodiment, a plurality of basic memory units 100 may be defined, each occupying a predetermined space in the storage device 52.

The basic memory units 100 may be distinguished from each other, and to this purpose, may include a basic memory unit identifier (Unit ID) 110 to identify each from the others. For example, the basic memory unit 100 (U22) illustrated in FIG. 1B may have an identifier U22.

One basic memory unit 100 may belong to 0, 1 or a plurality of networks, and each network may be so formed that the basic memory units 100 are in unidirectional linking relationship with each other. Each basic memory unit 100 may include a database 120 to represent the above-mentioned linking relationship.

The database 120 may have a storage space to write one or more records therein, and each record may include two or more fields. The network identifier field as the first field (F1, Net ID) may write information to identify the network to which each basic memory unit 100 belongs. Further, the basic memory unit link field as the second field (F2, Linked Unit ID) may write information to indicate which of the basic memory units is connected from among the basic memory units belonging to the network identified by the first field. The information may be related to the basic memory unit identifier to identify another connected basic memory unit.

For example, the basic memory unit 100 (U22) illustrated in FIG. 1B has three records (R1, R2, R3), which suggests that this basic memory unit 100 (U22) belongs to three different networks. Among these, the first field F1 of the first record R1 represents that the basic memory unit 100 (U22) belongs to network N111. The second field F2 of the first record R1 represents that the basic memory unit 100 (U22) is connected to another basic memory unit 100 (U23) with the basic memory unit identifier of U23 among the basic memory units belonging to the network N111.

Meanwhile, as indicated above, a basic memory unit imitates neuron which is activated in response to an external stimulus or acts voluntarily. As used herein, the "activity" of the neuron may correspond to reacting in response to the stimulus from another neuron. Likewise, each basic memory unit 100 may additionally include information about a number of activations 130. The number of activations 130 may increase over time according to a predetermined rule, or re-set according to a predetermined rule. The basic memory unit 100 (U22) illustrated in FIG. 1B has a total activation number of 6000.

Figure 1D:
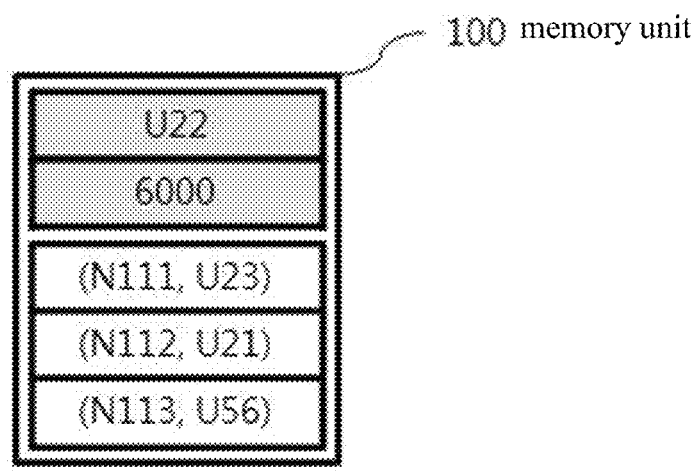

For simplification of the explanation, the structure of the basic memory unit 100 illustrated in FIG. 1B may be simply represented in the form as illustrated in FIG. 1C or 1D. Referring to FIGS. 1C and 1D, numbers beginning with letter 'N' such as N111, N112, N113 represent the values that are written in the network identifier field, and numbers beginning with letter 'U' such as U23, U21, U26 represent the basic memory unit identifiers. Referring to FIGS. 1C and 1D, U22 is given as the basic memory unit identifier of the basic memory unit 100 (U22), and the basic memory unit 100 (U22) belongs to all three networks N111, N112, N113. The basic memory unit identifiers of another basic memory units 100 connected to the basic memory unit 100 (U22) are U23, U21, U56, respectively. Among these, the basic memory unit identifier of the basic memory unit 100 (U23) belongs to the network N111, the basic memory unit 100 (U12) belongs to the network N112, and the basic memory unit 100 (U56) belongs to the network N113. Although the number of activations is not indicated in FIG. 1C, it is indicated in FIG. 1D.

Figure 2A:
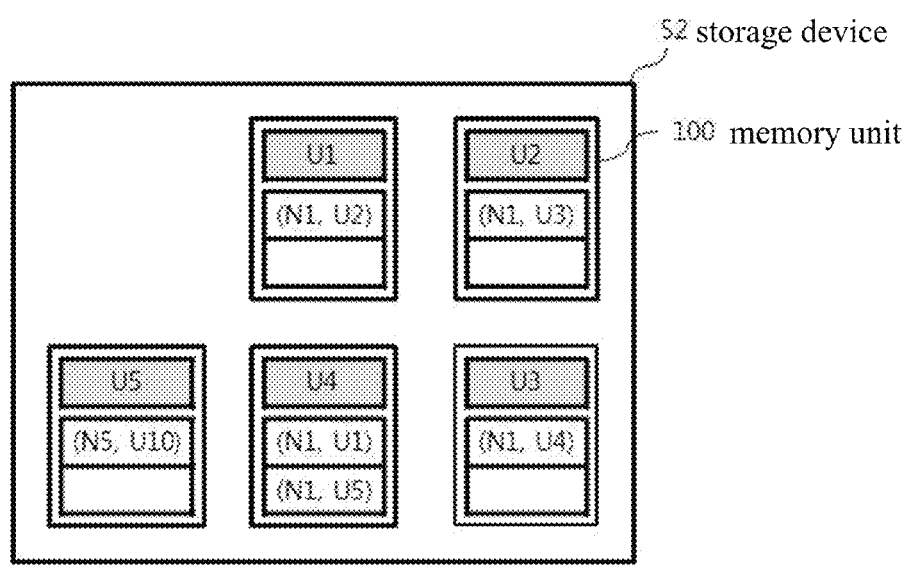
FIGS. 2A and 2B are provided to explain a method for defining a network based on the data stored on a basic memory unit, according to an embodiment of the present invention.
Figure 2B:
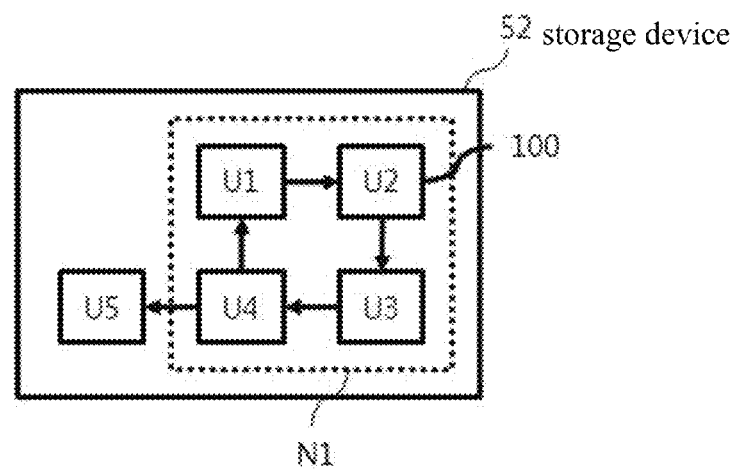

FIGS. 2A and 2B are provided to explain a method for defining a network based on the data stored at the basic memory unit according to an embodiment.

FIG. 2A shows an example of information stored at the basic memory units 100 of the storage device 52. For convenience of explanation, FIG. 2A exclusively illustrates five basic memory units 100 belonging to the network N1 among a plurality of memory units included in the storage device 52.

Referring to FIGS. 2A and 2B, the basic memory units U1, U2, U3, U4 belong to the network N1, and the basic memory units U1, U2, U3, and U4 indicate, regarding the network N1, the basic memory units U2, U3, U4 and U1, respectively. The basic memory unit U4 indicates the basic memory unit U5, but the basic memory unit U5 does not have a record regarding the network N1.

FIG. 2B visually reconstructs the information appearing in the text form in FIG. 2A. It is easily recognizable that the dotted line in FIG. 2B corresponds to the network identifier field, and the arrow of FIG. 2B corresponds to the basic memory unit link field of FIG. 2A. As exemplified with the network N1, according to one embodiment of the present invention, one network may be defined as a closed loop which is formed by a unidirectional linking among the basic memory units 100. Although there is an arrow pointing from the basic memory unit U4 toward the basic memory unit U5, because such connection is not included in the closed loop defining the network N1, the basic memory unit U5 is not counted as the constituent of the network N1. Accordingly, the information such as second record (N1, U5) written in the basic memory unit U4 may not be written or deleted (if written), because this information does not contribute to the formation of the network.

Referring to FIG. 2A, the process of defining one network with (N) number of basic memory units may be generalized as follows. That is, one network N1 may be defined by writing information representing the first network N1 in the network identifier field of the first records, which are respectively included in the (N) number of basic memory units U1, U2, U3, U4, and by writing information representing the basic memory unit identifier of the [mod(i, N)+1]th basic memory unit in the basic memory unit link field of the first record included in the [i]th basic memory unit from among the (N) number of basic memory units U1, U2, U3, U4. Referring to FIG. 2A, N=4, and [mod(i, N)+1] may be expressed as follows.

TABLE 1

| i | Mod(I, N) + 1 | Connection |
|---|---|---|
| 1 | 2 | U1→U2 |
| 2 | 3 | U2→U3 |
| 3 | 4 | U3→U4 |
| 4 | 5 | U4→U1 |

Figure 3A:
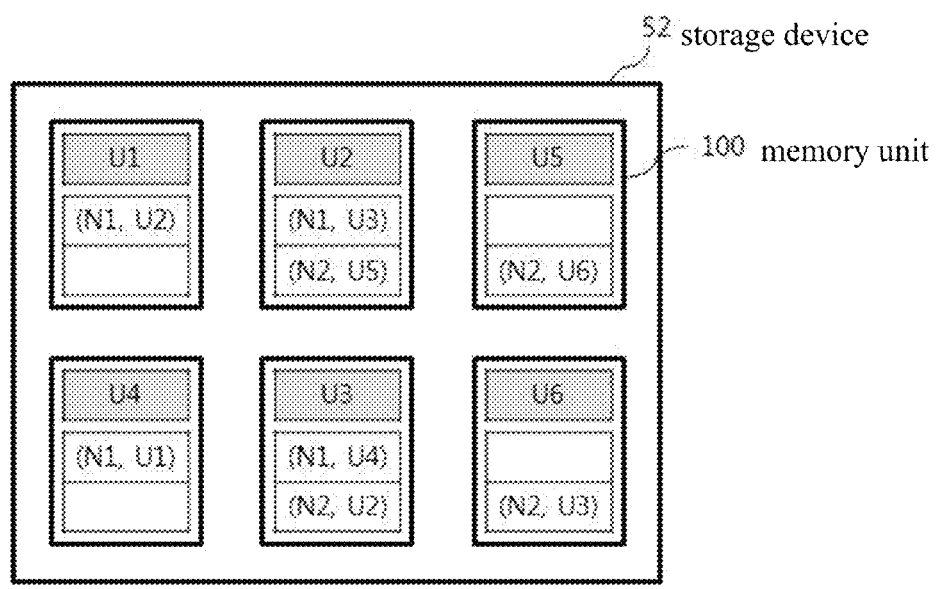
FIGS. 3A and 3C are provided to explain a method for defining two or more networks, according to an embodiment of the present invention.
Figure 3B:
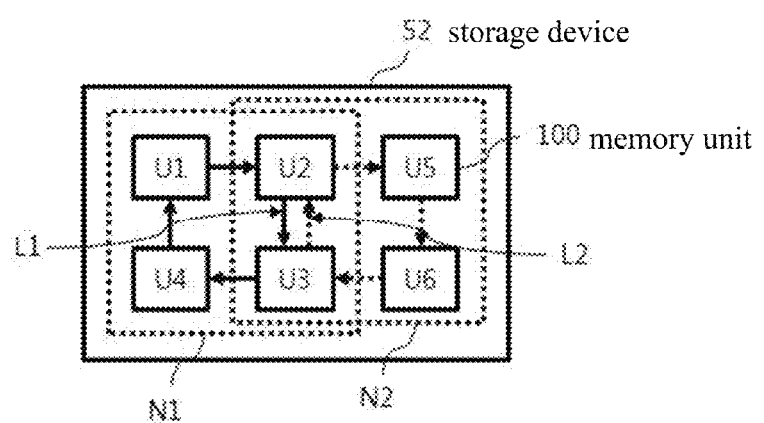

FIGS. 3A and 3B are provided to explain a method for defining two or more networks according to an embodiment of the present invention.

Among the plurality of memory units included in the storage device 52 (FIG. 1A), FIG. 3A exclusively shows four basic memory units U2, U5, U6, U3 belonging to the network N2 together with the four basic memory units U1, U2, U3, U4 which also belong to the network N1. Because the basic memory units U2, U3 belong to two networks N1, N2, these each have at least two records.

Referring to FIG. 3A, the network N1 is defined as the information regarding the network N1 is written in the first records of the basic memory units U1, U2, U3, U4. The network N2 is then defined as the information regarding the network N2 is written in the second records of the basic memory units U2, U5, U6, U3. In one embodiment, a new network may additionally be defined when two networks N1, N2 are defined as explained above.

Before explaining a method for defining a new network when two or more networks are given, the way of activation performed by the respective basic memory units 100 will first be explained. As used herein, 'activating' may refer to performing at a specific basic memory unit 100 a corresponding action in response to stimulus. Referring to FIG. 3A, in response to a stimulus inputted to the basic memory unit U1 belonging to the network N1, the basic memory unit U1 transmits the stimulus to the basic memory unit U2 belonging to the network N1. On receiving the stimulus, the basic memory unit U2 transmits the received stimulus to not only the basic memory unit U3 belonging to the same network N1, but also the basic memory unit U5 belonging to another network N2. That is, while the stimulus is initially given to a basic memory unit belonging to the network N1, the stimulus may be transmitted to another network N2. Accordingly, regardless of which network the stimulus is initially given, the stimulus given to a specific basic memory unit 100 may be transmitted to all the other networks that the basic memory unit 100, the first recipient of the stimulus, belongs to. In one embodiment, when the basic memory unit is activating, it may refer to the activity of the basic memory unit which transmits the received stimulus to the basic memory unit(s) belonging to one or more networks that the first recipient basic memory unit belongs to.

Likewise, referring to FIG. 3B, over time, the basic memory unit U3 may receive stimulus from the other basic memory unit U2 or U6. If stimulus is received at the basic memory unit U3, the basic memory unit U3 transmits the stimulus to the other basic memory units U2, U4.

According to the way of activating as explained above, it is clear that the frequency of activations of the basic memory units U1, U4, U5, U6 is far less than the number of activations by the basic memory units U2, U3. This is because a new closed loop is formed between the basic memory units U2, U3. This new closed loop is formed by the arrows L1, L2 of FIG. 3B. The arrow L1 represents part of the link inside the network N1, and the arrow L2 represents part of the link inside the network N2. Accordingly, the new closed loop is formed by the consolidation of the links existing in different networks from each other. This new closed loop may define a new network N3 and the two basic memory units U2, U3 are the constituents of the network N3.

Figure 3C:
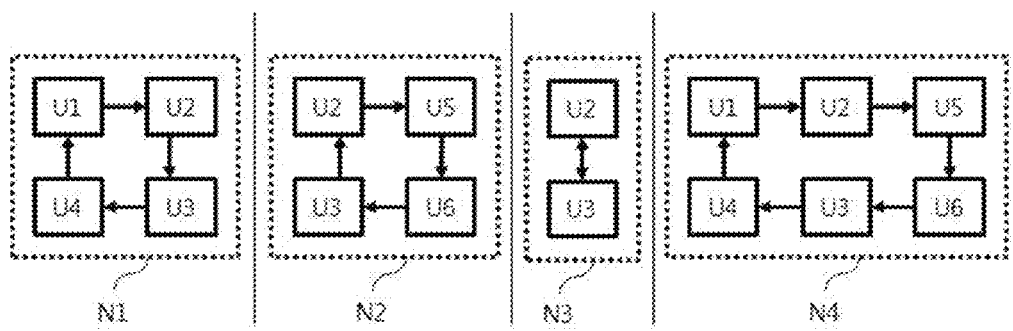

This new closed loop may be formed by a combination of one or more factors explained below. First, a basic memory unit is necessary, which connects two or more networks, to form a new closed loop. Referring to FIGS. 3A-3C, the basic memory units U2, U3 play the role of connecting the networks N1, N2, respectively. Second, on receiving stimulus, the basic memory unit 100 transmits the stimulus to all the other networks that the basic memory unit 100 belongs to.

Referring to FIG. 3B, if stimulus is inputted to any of the basic memory units U1~U6, over time, all the basic memory units U1~U6 begin activations in sequence, with the basic memory units U2, U3 having the more frequent activations than the others. If the network is divided into a strong one and a weak one, the network N3 formed by the basic memory units U2, U3 may be evaluated to be stronger than the other networks N1, N2, because the constituent basic memory units U2, U3 have more frequent activations than the others.

Accordingly, when a new closed loop is constructed by the consolidation of the links of different networks, this closed loop may define a new network. FIG. 3C shows the network that may be defined in the situation illustrated in FIG. 3B. Referring to FIG. 3C, the information regarding the networks N1, N2 may be stored individually in the basic memory units 100 included in the storage device 52. However, as the networks N1, N2 are consolidated, not only the new network N3 explained above, but also yet another new network N4 may be defined. Provided that the stimulus is transmitted among the basic memory units 100 with constant speed, the network N3 from among the four networks N1~N4 may have the most frequent activations, while the network N4 may have the least frequent activations in a given time. It may be defined that a network activation is completed once, when the stimulus initiated from a specific basic memory unit 100 within the network returns to the specific basic memory unit 100.

Figure 4:
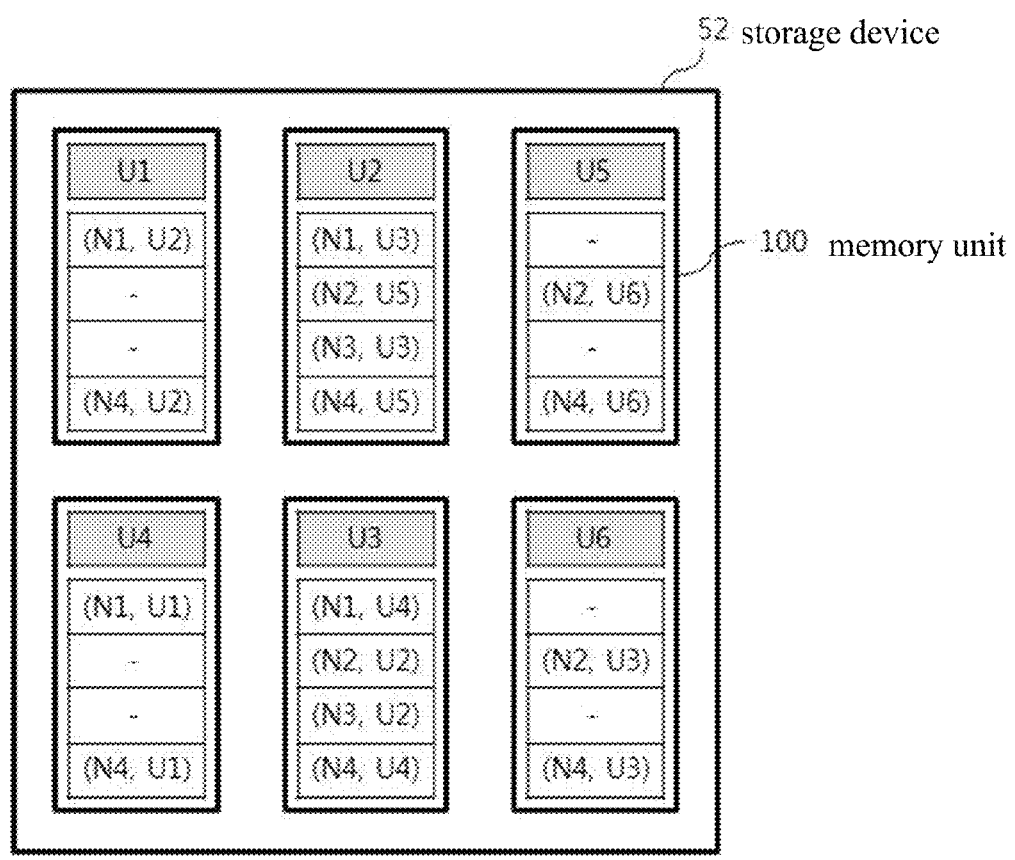
FIG. 4 is a view provided to explain a method for extracting network information according to an embodiment of the present invention.

Referring to FIG. 3C, if all the new networks N3, N4 are found, the information regarding the newly found networks N3, N4 may be stored in the basic memory units 100. FIG. 4 shows the storage device 52 with the information regarding the new networks N3, N4 written therein.

Referring to FIG. 3, if stimulus is inputted to a specific basic memory unit 100, the stimulus may be an externally-originated one or an internally-originated one according to a predetermined rule in the basic memory unit 100.

FIG. 4 is provided to explain a method for extracting network information according to an embodiment of the present invention.

In a state that the plurality of networks are defined as illustrated in FIG. 4, the user may wish to extract the information about one of the networks. By way of example, stimulus may be given to the basic memory unit U1 to extract the information about the network N1. The stimulus may propagate from the basic memory unit U1 to the basic memory units U1~U6, causing these basic memory units to act. The information about the networks N1~N4 may then be obtained by extracting all the information including the basic memory units U1~U6 in activation. As a result, starting from the attempt to extract information about the network N1, the information about the other related networks N2~N4 may be additionally obtained.

Figure 5:
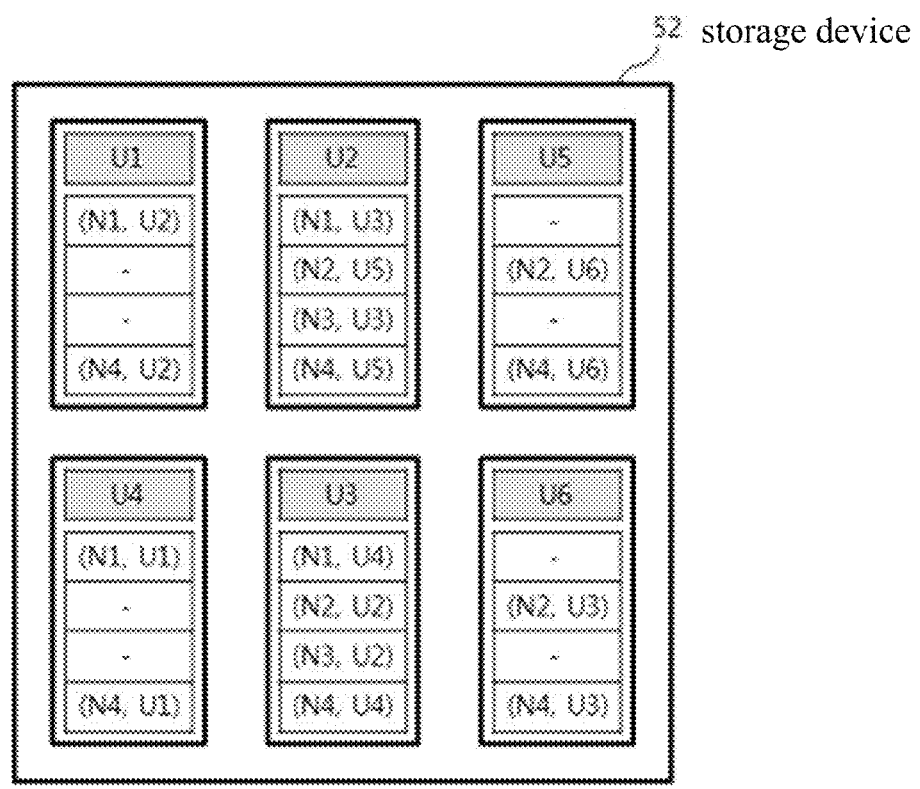
FIG. 5 illustrates a method for applying the network creating/management method of FIGS. 1 to 4 to an information search system.

FIG. 5 illustrates a method for applying the method for creating/managing network of FIGS. 1 to 4 in an information search system.

FIG. 5 particularly shows substituting the networks N1~N4 of FIG. 4 in specific keywords for search. That is, the networks N1, N2, N3, N4 may be expressed in the names of 'oriental melon', 'banana', 'yellow fruit', 'fruit', respectively. Once the plurality of networks N1, N2, N3 N4 are defined (FIG. 4), the user may wish to extract information about one of the networks. For example, stimulus may be given to the basic memory unit U1 to extract information about the network N1 ('oriental melon'). The stimulus propagates from the basic memory unit U1, activating the other basic memory units U1~U6. By extracting all the information included in the basic memory units U1~U6 in activation, information about the networks N2 ('banana'), N3 ('yellow fruit'), N4 ('fruit'), can be obtained respectively. As a result, the user, who initially attempts to extract the information about 'oriental melon' only, may be able to extract the information about the other associated words, i.e., 'banana', 'yellow fruit', 'fruit'. According to the method as illustrated in FIG. 5, considering the propagation of the stimulus 'oriental melon' inputted to the network to the other networks of 'banana', 'yellow fruit' and 'fruit', it may be considered that the words are associated with each other. The degree of association of the words may be determined by various criteria including, for example, proportion of activations of the respective networks in response to the stimulus inputted to the network 'oriental melon'.

According to embodiments of the present invention, a method for defining one network and a structure of the basic memory units to implement the method, and a method for automatically defining another new network when there are two or more defined networks, are explained. A related database structure is also explained. Meanwhile, depending on embodiments, how to select basic memory units to construct the networks (for example, N1, N2, FIGS. 3A-3C), except the network automatically created by the combination of the pre-existing networks, may be determined according to pre-determined other rules. Further, the meaning of the networks (for example, N3, N4, FIG. 4) automatically created by the combination of the pre-existing networks, and how to give this meaning to the networks N3, N4 may be implemented according to different constant rules. That is, while the networks N1, N2 may be pre-set to represent 'oriental melon' and 'banana' as explained above with reference to FIG. 5, a method for corresponding the newly-created networks N3, N4 to the names of 'yellow fruit' and 'fruit' may be implemented by another rule that will not be specifically explained below.

FIG. 6 illustrates a network management method according to an embodiment of the present invention. The network management method will be explained below with reference to FIG. 6, in combination with FIGS. 1 and 3A-3C.

The method manages one or more networks maintained in the memory (i.e., storage device 52) including a plurality of basic memory units 100 and an electronic device (i.e., computer device 50) including one or more processors (i.e., processing device 51), by using the plurality of basic memory units 100.

At step S101, information defining first unidirectional links among (N) number of basic memory units is written in (N) basic memory units, so that one first closed loop is defined by the (N) number of basic memory units among the plurality of basic memory units. At step S102, to define one second closed loop by (M) number of basic memory units among the plurality of basic memory units, information defining second unidirectional links between the (M) number of basic memory units is written in (M) number of basic memory units. At step S103, a third closed loop is defined based on the first and second closed loops. At this time, first, second, and third networks N1, N2, N3 may be defined by the first, second, and third closed loops. The first and second loops may share one or more basic memory units in common. The first closed loop may be formed by the consolidation of the first links pointing from the [i]th basic memory unit toward the [mod(i, N)+1]th basic memory unit (1≤i≤N, i, N=integer), the second closed loop may be formed by the consolidation of the second links pointing from the [j]th basic memory unit toward the [mod(j, M)+1]th basic memory unit (1≤j≤M, j, M=integer), and the third closed loop may be formed by the consolidation of the third links pointing from the [k]th basic memory unit toward the [mod(k, L)+1]th basic memory unit (1≤k≤L, k, L=integer). The 'link' as used herein may refer to a connection between the basic memory units as represented by the arrows of FIG. 3B. Referring to the examples of FIG. 3, N=4, M=4, L=2 or L=6.

According to another embodiment of the present invention, a network management method is provided, which manages a plurality of networks maintained in an electronic device including one or more processors and memories, using a plurality of basic memory units each including a basic memory unit identifier, a network identifier field to identify a network, and a basic memory unit link field corresponding to the network identifier field. Among the plurality of basic memory units, the information representing the first network is written in the network identifier fields of the first records respectively included in the (N) number of basic memory units, and information representing the basic memory unit identifier of the [mod(i, N)+1]th basic memory unit is written in the basic memory unit link field of the first record included in the [i]th basic memory unit among the (N) number of basic memory units (1≤i≤N, i, N=integer). The network management method may include the step of writing information representing the second network in the network identifier fields of the second records respectively included in (M) number of basic memory units among the plurality of basic memory units, and writing information representing the basic memory unit identifier of the [mod(j, M)+1]th basic memory unit in the basic memory unit link field of the first record included in the [j]th basic memory unit among the (M) number of basic memory units (1≤j≤M, j, K=integer).

The method may additionally include reading out network information from the network identifier fields of the (N) or (M) number of basic memory units and outputting the read network information. Further, one or more of the (N) number of basic memory units may belong to the (M) number of basic memory units.

In another embodiment of the present invention, the network management method explained above may be implemented on a computer program. This will be explained below with reference to FIGS. 1 and 3. The program may include commands directing to change one or more content of the plurality of basic memory units 100 included in the electronic device. The plurality of basic memory units may each include one or more records R1, R2, R3, etc., including the basic memory unit identifier 110, the network identifier field F1 to identify a network and the basic memory unit link field F2.

When executed on the electronic device, the commands may direct so that the information representing the first network is written in the network identifier fields of the first records respectively included in the (N) number of basic memory units, and information representing the basic memory unit identifier of the [mod(i, N)+1]th basic memory unit is written in the basic memory unit link field of the first record included in the [i]th basic memory unit among the (N) number of basic memory units (1≤i≤N, i, N=integer).

When executed on the electronic device, the commands may direct so that the information representing the second network is written in the network identifier fields of the second records respectively included in the (M) number of basic memory units, and information representing the basic memory unit identifier of the [mod(j, M)+1]th basic memory unit is written in the basic memory unit link field of the second record included in the [j]th basic memory unit among the (M) number of basic memory units (1≤j≤M, j, M=integer).

When executed on the electronic device, the commands may direct so that the first closed loop, formed by the information included in the basic memory unit link fields of the first records respectively included in the (N) number of basic memory units, and the second closed loop, formed by the information included in the basic memory unit link fields of the second records respectively included in the (M) number of basic memory units, may construct another closed loop (third closed loop).

When executed on the electronic device, the commands may direct so that the third closed loop is formed as the information representing the third network is written in the network identifier fields of the third records respectively included in the (L) number of basic memory units, and as the information representing the basic memory unit identifier of the [mod(k, L)+1]th basic memory unit is written in the basic memory unit link field of the third record included in the [k]th basic memory unit among the (L) number of basic memory units (1≤k≤L, k, L=integer). The (L) number of basic memory units are the union of the (N) and (M) number of basic memory units.

The embodiments have been explained so far, with reference to certain forms of the elements and characteristics of the invention. The respective elements or characteristics are considered optional, unless otherwise specified. The respective elements or characteristics may be embodied in a form that is not combined with the other elements or characteristics. It is also possible to construct an embodiment of the invention by combining certain elements and/or characteristics. The order of operations as explained above in the embodiments is subject to change. Certain constitution or characteristic of one embodiment may be included in another, or replaced with the constitution or characteristic corresponding to another embodiment. It is apparent that an embodiment may be constructed by combining claims, unless linked based on dependency, or a new claim may be included by amendment after the filing.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims. Many alternatives, modifications, and variations will be apparent to those skilled in the art.

What is claimed is:

1. A non-transitory computer-readable medium recording therein one or more programs comprising commands directing to change one or more contents of a plurality of basic memory units included in an electronic device, wherein the improvement comprises the plurality of basic memory units each comprises a database comprising one or more records each comprising a basic memory unit identifier, a network identifier field to identify a network, and a basic memory unit link field, and when executed on the electronic device, the commands direct information representing a first network to be written in the network identifier fields of first records respectively included in (N) number of basic memory units, and information representing the basic memory unit identifier of a [mod(i, N)+1]th basic memory unit to be written in the basic memory unit link field of the first record included in a [i]th basic memory unit among the (N) number of basic memory units (1≤i≤N, i, N=integer), wherein when executed on the electronic device, the commands direct information representing a second network to be written in the network identifier fields of second records respectively included in (M) number of basic memory units, and information representing the basic memory unit identifier of a [mod(j, M)+1]th basic memory unit to be written in the basic memory unit link field of the second record included in a [j]th basic memory unit among the (M) number of basic memory units (1≤j≤M, j, M=integer).

2. The non-transitory computer-readable medium of claim 1, wherein when executed on the electronic device, the commands direct a first closed loop, formed by the information included in the basic memory unit link fields of the first records respectively included in the (N) number of basic memory units, and a second closed loop, formed by the information included in the basic memory unit link fields of the second records respectively included in the (M) number of basic memory units, to construct a third closed loop (M, N=integer).

3. The non-transitory computer-readable medium of claim 2, when executed on the electronic device, the commands direct the third closed loop formed as information representing a third network to be written in the network identifier fields of third records respectively included in the (L) number of basic memory units which are union of the (N) and (M) number of basic memory units, and as information representing the basic memory unit identifier of a [mod(k, L)+1]th basic memory unit to be written in the basic memory unit link field of the third record included in a [k]th basic memory unit among the (M) number of basic memory units (1≤k≤L, k, L, M, N=integer).

4. A non-transitory computer-readable medium recording therein one or more programs comprising commands directing to change one or more contents of a plurality of basic memory units included in an electronic device, wherein the improvement comprises when executed on the electronic device, the commands direct information regarding a first network to be written in (N) number of basic memory units among the plurality of basic memory units, and writing the information regarding the first network includes writing information defining first unidirectional links among the (N) number of basic memory units to the (N) number of basic memory units, wherein when executed on the electronic device, the commands direct information defining regarding a second network to be written in (M) number of basic memory units among the plurality of basic memory units, and writing the information regarding the second network includes writing information second unidirectional links among the (M) number of basic memory units to the (M) number of basic memory units, wherein when executed on the electronic device, the commands direct information regarding a third network to be written in (L) number of basic memory units which are union of the (N) and (M) number of basic memory units, writing the information regarding the third network includes writing information defining third unidirectional links among the (L) number of basic memory units to the (L) number of basic memory units, and the third closed loop is defined based on the first and second closed loops, wherein the first closed loop is formed as a [i]th basic memory unit of the (N) number of basic memory units points toward a [mod(i, N)+1]th basic memory unit (1≤i≤N, i, N=integer), the second closed loop is formed as a [j]th basic memory unit of the (M) number of basic memory units points toward a [mod(j, M)+1]th basic memory unit (1≤j≤M, j, M=integer), and the third closed loop is formed as a [k]th basic memory unit of the (L) number of basic memory units points toward a [mod(k, L)+1]th basic memory unit (1≤k≤L, k, L=integer).

5. A method for managing one or more networks maintained in an electronic device using a plurality of basic memory units, wherein the electronic device comprises a memory having the plurality of basic memory units, and one or more processors, the method comprising:

defining a first closed loop with (N) number of basic memory units of the plurality of basic memory units, by writing information defining first unidirectional links among the (N) number of basic memory units in the (N) number of basic memory units;

defining a second closed loop with (M) number of basic memory units of the plurality of basic memory units, by writing information defining second unidirectional links among the (M) number of basic memory units in the (M) number of basic memory units; and defining a third closed loop based on the first and second closed loops, wherein a first, second, and third networks are defined by the first, second, and third closed loops, wherein the first closed loop is formed by a consolidation of the first unidirectional links pointed at a [i]th basic memory unit of the (N) number of basic memory units toward a [mod(i, N)+1]th basic memory unit (1≤i≤N, i, N=integer), the second closed loop is formed by a consolidation of the second unidirectional links pointed at a [j]th basic memory unit of the (M) number of basic memory units toward a [mod(j, M)+1]th basic memory unit (1≤j≤M, j, M=integer), and the third closed loop is formed by a consolidation of the third unidirectional links pointed at a [k]th basic memory unit of the (L) number of basic memory units toward a [mod(k, L)+1]th basic memory unit (1≤k≤L, k, L=integer).

6. The method of claim 5, wherein the first and second closed loops share one or more basic memory units in common.

\* \* \* \* \*